United States Patent [19]
Knox et al.

[11] Patent Number: 5,822,106
[45] Date of Patent: Oct. 13, 1998

[54] SYNCHRONIZATION OF DIGITAL SYSTEMS USING OPTICAL PULSES AND MDOULATORS

[75] Inventors: Wayne H. Knox, Rumson, N.J.; David A. Miller, Stanford, Calif.

[73] Assignee: Lucent Technologies Inc., Murray Hill, N.J.

[21] Appl. No.: 774,551

[22] Filed: Dec. 30, 1996

[51] Int. Cl.$^6$ .................................................. G02F 1/03
[52] U.S. Cl. ..................... 359/245; 359/158; 327/141
[58] Field of Search ............................. 327/141; 359/158, 359/245

[56] References Cited

U.S. PATENT DOCUMENTS

| | | | |
|---|---|---|---|
| 4,525,687 | 6/1985 | Chelma et al. | 332/751 |
| 4,959,540 | 9/1990 | Fan et al. | 250/227.12 |
| 5,150,068 | 9/1992 | Kawashima et al. | 328/155 |
| 5,184,027 | 2/1993 | Masuda et al. | 307/269 |
| 5,250,816 | 10/1993 | Kitamura | 257/81 |
| 5,251,097 | 10/1993 | Simmons et al. | 361/687 |
| 5,289,303 | 2/1994 | Cloonan et al. | 359/139 |
| 5,296,749 | 3/1994 | Wicklund et al. | 307/303.1 |
| 5,329,188 | 7/1994 | Sikkink et al. | 307/517 |
| 5,526,155 | 6/1996 | Knox et al. | 359/130 |

OTHER PUBLICATIONS

*Experimental Sensitivity Studies of Diode–Clamped FET–SEED Smart–Pixel Optical Receivers*. Ted K. Woodward, IEEE Journal of Quantum Electronics, vol. 30, No. 10 pgs. 2319–2324, Oct. 1994.

*Optical Energy Considerations for Diode–Clamped Smart Pixel Optical Receivers* by Anthony L. Lentine, IEEE Journal of Quantum Electronics, vol. 30, No. 5, pp. 1167–1171, May 1994.

*Computing With Light* by David A.B. Miller, pp. 134–147, 1994.

*A Synchronous Approach for Clocking VLSI Systems* by Francois Anceau, IEEE *Mbit/sec Capability For Fiber–In–The–Loop Applications*, by K.W. Goosen et al., IEEE Journal of Solid–State Circuits, vol. SC–17, No. 1, pp. 51–56, Feb. 1982.

*Mode–locked pulse operation of GaAs/AlGaAs field effect transistor self–electric–optic effect device smart pixels and saturation considerations* by G.D. Boyd et al., American Institute of Physics, pp. 3108–3110, Dec. 1994.

*Primary Examiner*—Georgia Y. Epps
*Assistant Examiner*—Dawn-Marie Bey

[57] ABSTRACT

The present invention provides synchronization of logic signals in a digital system using optical pulses generated from optical modulators. In one embodiment of the present invention, electrically driven optical modulators are positioned at electrical outputs of interest, and the modulators are read out in accordance with synchronized optical pulses produced from a timing source, where the optical pulse lengths are relatively short compared to the electrical output pulse length. The resulting modulated optical pulses output from the optical modulators are then all once more synchronous, with the skew in the original electrical signals having been removed. These optical pulses can then be communicated over optical channels, such as fiber or free space, with well controlled delay, thereby also reducing problems of variable delay in electrical connections. The optical signals can then be read by photodetectors at the inputs to further stages of digital processing, giving inputs that are synchronized once more despite the different delays or skews in the original electrical signals.

23 Claims, 3 Drawing Sheets

SYNCHRONIZATION OF DIGITAL SYSTEMS USING OPTICAL PULSES AND MDOULATORS

FIELD OF THE INVENTION

The present invention relates generally digital systems, and more particularly to the synchronization of logic signals within a digital system.

BACKGROUND OF THE INVENTION

In digital systems, it is important that logic signals are synchronized within defined time windows so that valid logical decisions can be made. As a result, digital systems often have so-called "clock" signals that are intended to define these time windows. As would be understood by a person skilled in the art, some of the problems associated with the synchronization of logic signals within a large digital system are that different circuits within the system can have different amounts of delay and that the interconnections between different parts of a system may have different propagation delays. These problems are known collectively as "signal skew". Solving signal skew problems by electronic means can involve building additional circuits, such as buffers and clock recovery circuits, that can add to the overall cost of a digital system, while at the same time slowing down the operation of the system. Moreover, with the inclusion of these additional circuits, the advantages of the relative simplicity of a system in which all signals are synchronous are lost.

Heretofore, the prior art has only to a limited extent addressed the problem of signal skew in digital systems using technologies other than those including purely electronic means. For example, U.S. Pat. No. 4,959,540 to Fan et al. discloses an optical clock system for high speed computing systems which uses a direct optical connection to active devices in the computing system to eliminate signal skew due to passive circuit elements. U.S. Pat. No. 5,250,816 to Kitamura discloses another clock signal supply unit which transforms an electrical clock signal into a light signal which is then transmitted to specific semiconductor chips in the system having photodetectors capable of receiving the light signal. In this way clock skew caused by impedance of aluminum wires is eliminated.

The above references address the problem of initially generating a series of properly timed clock signals in a digital system using technologies other than those including purely electronic means. Certain digital systems, however, such as those found in digital telecommunications systems, require re-synchronization of timing signals that have begun to "mis-behave" as they travel throughout a communications network. In this case, the above references would not be helpful in addressing the problem of signal skew as it relates to such a system. Accordingly, there is a need for a more efficient manner in which to handle signal skew as it relates to the re-synchronization of timing signals as they travel within a digital system, for example, a digital communications system.

SUMMARY OF THE INVENTION

The present invention solves the above problems by providing synchronization of logic signals in a digital system using optical pulses generated from optical modulators. In one embodiment of the present invention, electrically driven optical modulators are positioned at electrical outputs of interest, and the modulators are read out in accordance with synchronized optical pulses produced from a timing source, where the optical pulse lengths are relatively short compared to the electrical output pulse length. The resulting modulated optical pulses output from the optical modulators are then all once more synchronous, with the skew in the original electrical signals having been removed. These optical pulses can then be communicated over optical channels, such as fiber or free space, with well controlled delay, thereby also reducing problems of variable delay in electrical connections. The optical signals can then be read by photodetectors at the inputs to further stages of digital processing, giving inputs that are synchronized once more despite the different delays or skews in the original electrical signals.

In an alternate embodiment of the present invention, the signals generated from the optical modulators are amplified by a given amount by an optical amplifier in order to reduce the amount of power required by pulses generated from a single timing source. In another embodiment of the present invention, laser diode amplifiers are used in place of the optical modulator/optical amplifier combination.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

The present invention is an apparatus and method for the synchronization of logic signals in a digital system using optical pulses generated from optical modulators. Although the present invention is described with reference to an exemplary embodiment of a digital system having particular applicability to the telecommunications industry, it would be understood that the synchronization methodology of the present invention may also be used with other types of digital systems not directly related to the telecommunications field.

Figure 1:
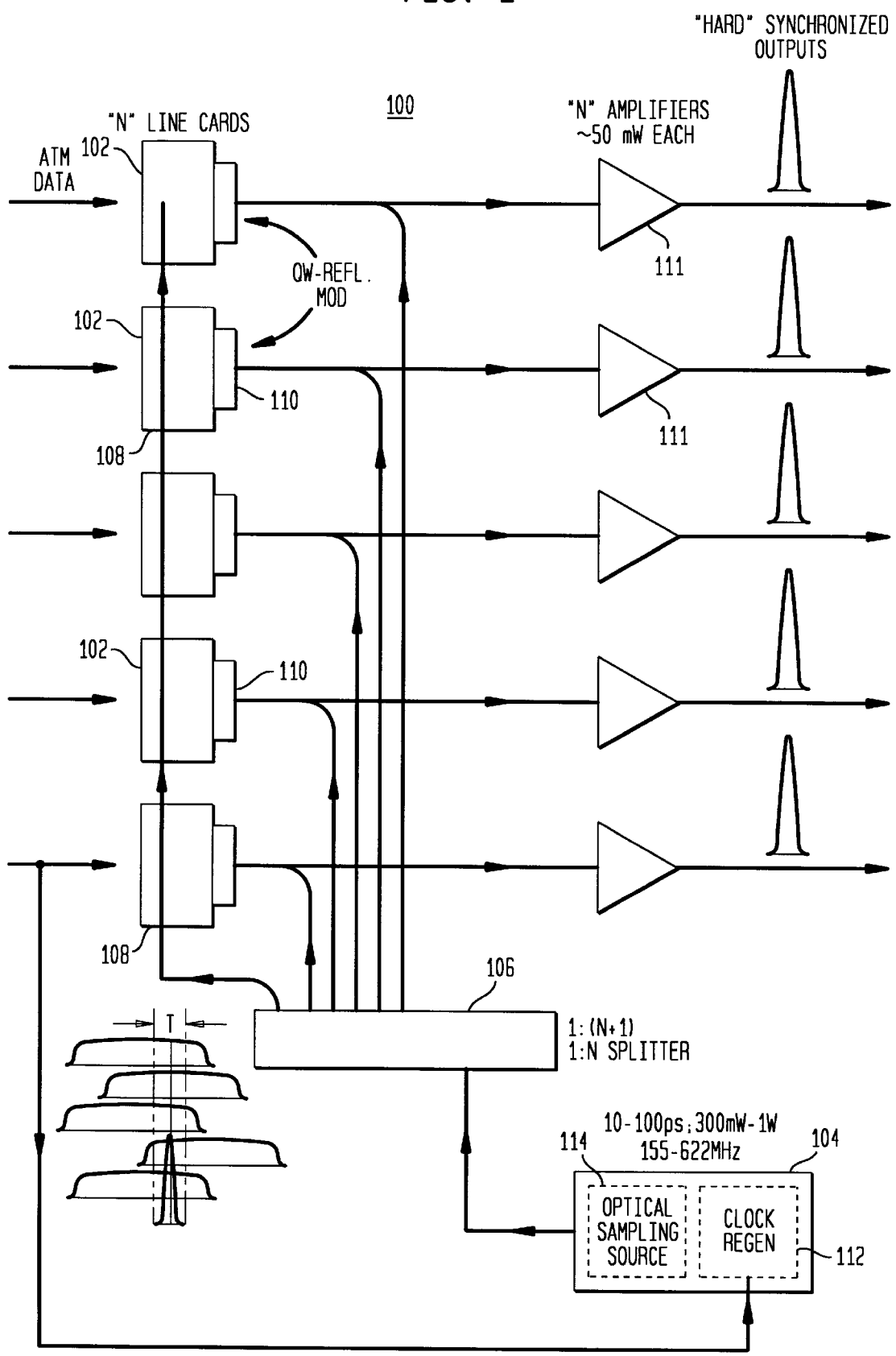
FIG. 1 shows a circuit diagram for one embodiment of an optical synchronization scheme for logic signals of a digital system accomplished in accordance with principles of the present invention.

Referring to FIG. 1, there is shown one exemplary embodiment of a digital system 100 used in conjunction with the optical synchronization methodology of the present invention. As shown, the digital system 100 includes a plurality of "N" line cards 102 which are adapted to receive digital data and which are embodied, for example, at a node or switch location of a telecommunications network. A typical problem with a digital system, such as that shown in FIG. 1, is that signal data, for example ATM data, is received at multiple inputs of the system 100, i.e., at the line cards 102, but the data is not synchronized. That is, the line cards 102 produce data at a correct repetition rate, but because of the physical makeup of the system and other system characteristics which create signal skew problems, the timing of each of the line cards may drift such that the timing needs to be constantly adjusted.

The present invention solves the above timing drift problem by re-timing the received timing signals using short optical pulses to automatically synchronize or re-synchronize the received signals. As shown in FIG. 1, an optical clock 104 generates a relatively short optical timing pulse compared to the electrical signal, having a duration of, for example, between 10–100 ps and power output of 30 mV −1 W. In a switch system having N line cards 102, the optical pulse enters a 1 :(N+1) splitter 106, where the single optical pulse is split up into "N+1" beams. A single beam synchronizes latch inputs 108 of the line cards 102 and the remainder of the individual beams are directed, respectively, toward optical modulators 110 that are coupled to outputs of the individual line cards 102. The optical modulators 110 are electrically driven using the respective data received at each line card, but are read out using the synchronized optical timing pulses generated from the optical clock 104. The modulated optical pulses output from the optical modulators 110 result in synchronized optical pulses with the skew in the original electrical signals having been removed. These optical pulses can then be communicated over optical channels, such as fiber or free space, with well controlled delay, thereby also reducing problems of variable delay in electrical connections. For example, as would be understood, in optics the delay of different paths can be controlled accurately by control of the optical path length. The optical signals can then be read by photodetectors at the inputs to further stages of the digital system, giving inputs that are synchronized once more despite the different delays or skews in the original electrical signals.

Figure 2:
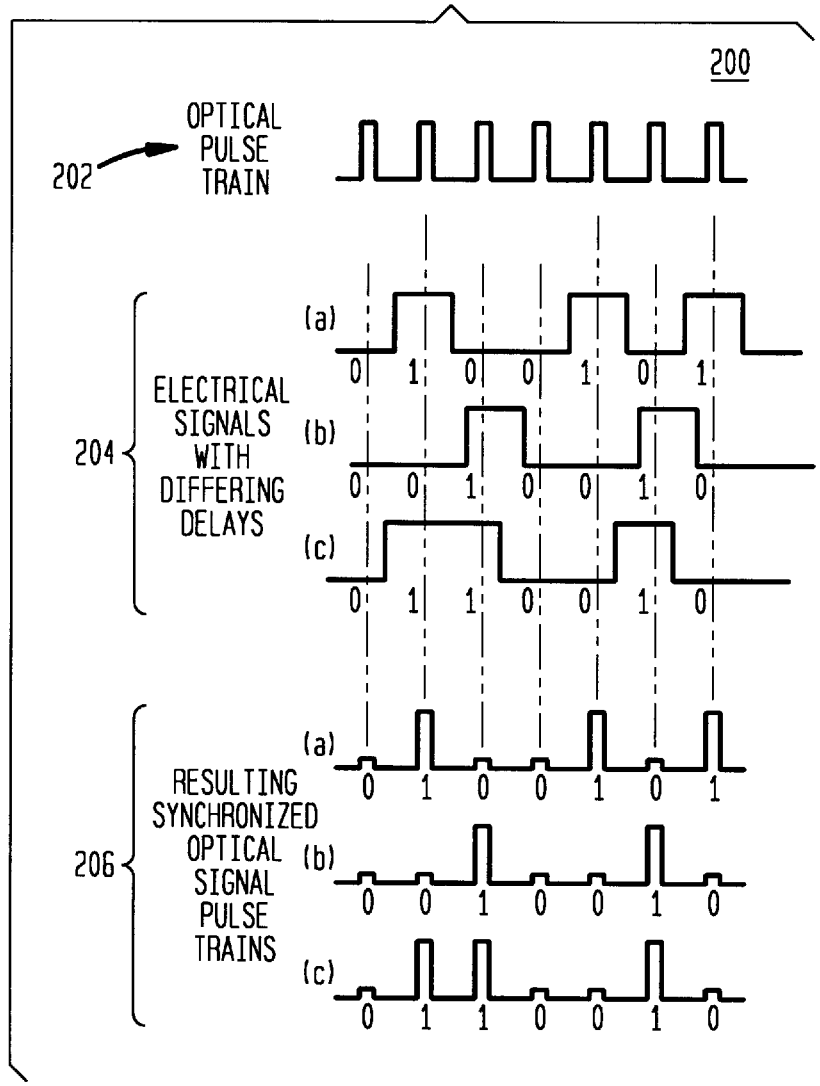
FIG. 2 shows a timing diagram illustrating the results of the present invention re-synchronization methodology.

FIG. 2 shows a graphic illustration 200 of the re-timing performed by the optical synchronization scheme of the present invention. As shown, an optical pulse train 202 is generated from the optical clock and directed toward the optical modulators. Timing diagrams 204 for electrical signals having differing delays and generated from different ones of the line cards 102 are shown beneath the optical pulse train 202. As can be seen, the signals produced from the line cards are out of synchronization with one another and accordingly would be considered skewed in relation to one another. In accordance with the principles of the present invention, the signals produced from the line cards are then input to the optical modulators, wherein the optical modulators are read out in accordance with the optical pulse train 202 directed thereto. As shown beneath the timing diagram for the electrical signals 204, this results in a synchronized optical signal pulse train 206 being produced at the outputs of the optical modulators. As has been discussed, the optical pulses are intended to be short relative to the duration of the electrical pulses.

As a practical matter, in order to transmit data at 155 MHz or 622 MHz utilizing only the optical modulators, up to 90 mW per line of average power is required. For an ATM switching system of the type shown in FIG. 1 which includes 1024 lines, this equates to (90 mW)×(1024)=92 W, which makes this type of power output requirement unrealistic. A solution is to add an optical amplifier 111 with a gain of between 50–100times the input signal to each line. This results in hard synchronized outputs having the proper output power at the outputs of the digital system 100 corresponding to of each of the line cards 104. Each line now outputs a 100 ps pulse, for example, that is precision synchronized to the other lines and that is protected against drift. As would be understood, as long as the pulses arrive within a designated time window T, as illustrated in FIG. 1, amplitude is not affected. As shown in FIG. 1, the optical modulators 110 are Quantum-well reflective modulators, it would be understood, however, that other types of optical modulating devices could also be used. These would include other electroabsorption modulators, such as bulk semiconductor modulators, electrooptic modulators, such as Lithium Niobate devices, or electrically gated optical amplifiers. Also as shown in FIG. 1, the optical clock 104 includes a clock regeneration circuit 112 which taps off of the clock signal that is input to at least one of the line cards 104. The clock regeneration circuit 112 is coupled to an optical sampling source 114 which in turn has an output coupled to the splitter 106.

The synchronization methodology of the present invention has the advantage that all optical outputs are of the same wavelength and therefore the system need not be achromatized or adjusted for specific wavelengths. Since the wavelengths are all the same, this also indicates that the laser diode amplifiers need not be wavelength selected. As shown in FIG. 1, besides the optical modulator 110, the system would only require the cost of an additional amplifier per line to implement the synchronization scheme. As would be understood, a larger amplifier may additionally or alternatively also be placed further up-line for appropriate signal amplification.

Figure 3:
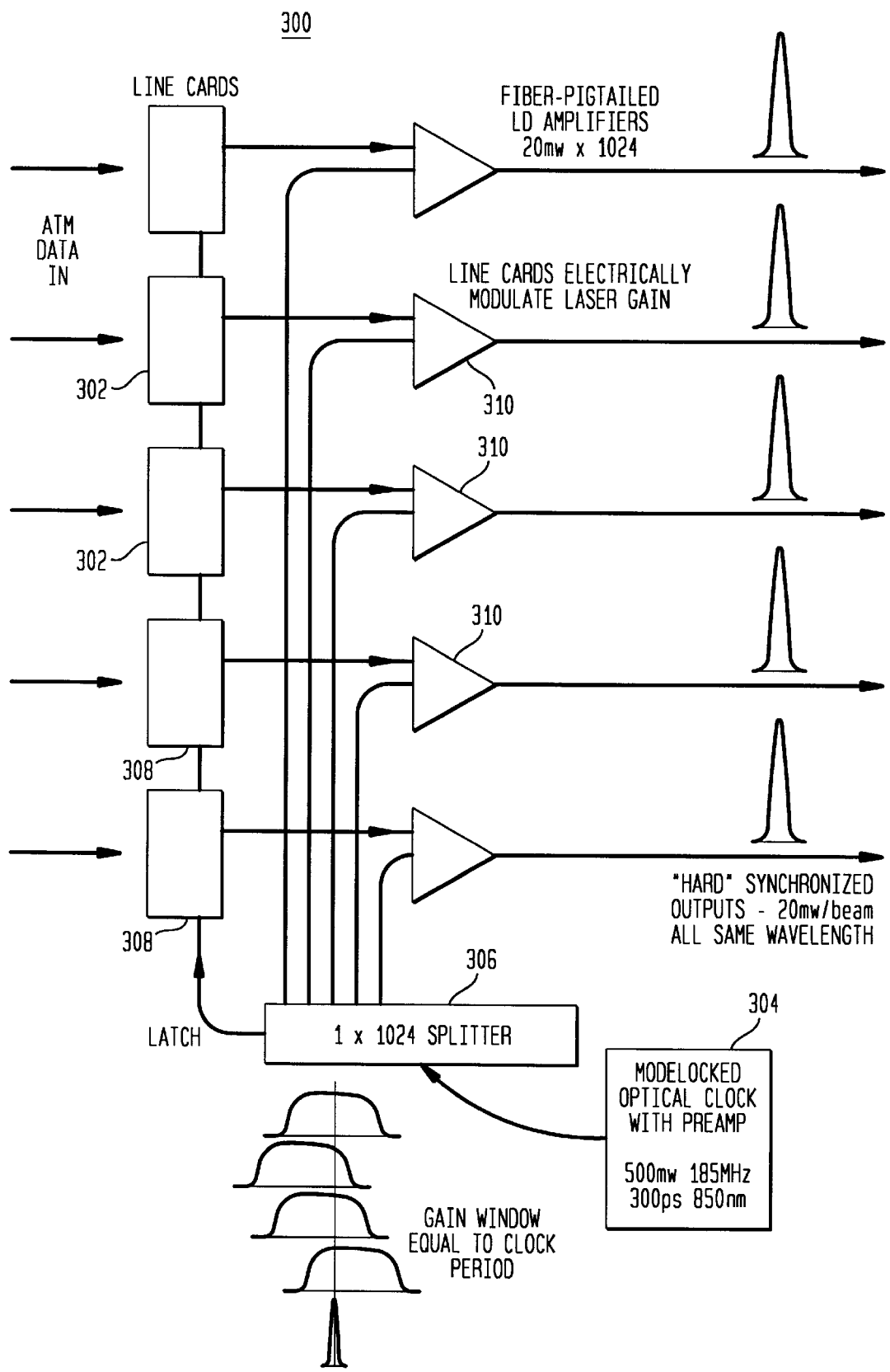
FIG. 3 shows a circuit diagram for an alternate embodiment of an optical synchronization scheme for logic signals of a digital system accomplished in accordance with principles of the present invention.

Referring to FIG. 3, an alternate embodiment of the present invention optical synchronization system 300 is shown. In a similar fashion to FIG. 1, a digital system is shown which includes N line cards 302 for receiving ATM data. An optical clock 304, for example, a mode-locked optical clock with preamplifier generates a pulse train of synchronized optical pulses which are input to an optical splitter 306. As shown, a typical pulse which is generated to a 1×1024 splitter will be approximately a 500 mW pulse at 185 MHz with a 300 ps duration and 850 nm wavelength. Typically, one of the beams output from the splitter 306 is used to control the latch inputs 308 for the plurality of line cards. In the embodiment shown in FIG. 3, the remainder of the beams output from the splitter 306 are input directly to laser diode amplifiers 310 which also receive a corresponding output from each of the line cards 302. The amplifiers 310 are preferably gain modulated fiber-pigtailed semiconductor amplifiers which serve the dual function of providing modulation as well as gain. That is, the line cards 302 electrically modulate the laser gain to provide an amplified and modulated output in accordance with the optical pulse train generated by the optical clock 304. By receiving data from the line cards using direct optical modulation of the diode amplifiers 310, the need for purely optical modulators is eliminated. This is advantageous in that most optical modulators are lossy and are not always available in commercially packaged units. One source of laser diode amplifiers contemplated for use with the present invention is the David Sarnoff Research Center, CN 53000, Princeton, NJ 08543, wherein the amplifiers are referenced as super luminescent diodes (SLD) and optical amplifiers and are available in wavelengths from 800 nm to 1600 nm.

The present invention optical synchronization scheme provides hard synchronized outputs at the outputs of the laser diode amplifiers 310 with an output power of 20mW/beam, where all of the beams have the same wavelength, if desired, thereby eliminating the need to achromatize the optical system. As would be understood, it would be possible for the timing of the line card output to drift up to one clock cycle, however, the short optical pulse of the present invention system essentially "samples" the state of the node; accordingly, the short pulse will not ever drift since all pulses originate from the same source. The present invention is also advantageous in that the wavelength specifications on the amplifiers is somewhat relaxed and the balancing of all channels can be accomplished independently. That is, the amplifiers 310 discussed with respect to FIG. 3 have a shifted gain spectra and each of the channels can be independently balanced by varying the electrical bits. The instant embodiment is also advantageous in that the power requirements for the system 300 are substantially relaxed with a draw of only 20 mW per channel. For a system of 1024 line cards this equates to a total power draw of 20 W which is a significant reduction over the embodiment shown in FIG. 1.

From the above, it should be understood that the embodiments described, in regard to the drawings, are merely exemplary and that a person skilled in the art may make variations and modifications to the shown embodiments without departing from the spirit and scope of the invention. For example, it would be understood by a person skilled in the art that there are many methods of obtaining synchronized optical pulses as used in the present invention, such as deriving all of the pulses from a single source split along many paths, as well as other well-known methods. All such variations and modifications are intended to be included within the scope of the invention as defined in the appended claims.

What is claimed is:

1. In a system for processing digital electrical signals wherein said processing of at least a portion of said signals is referenced to a common timing signal an apparatus for causing a re-synchronization of said digital electrical signals with said timing reference, said apparatus comprising:

at least one signal source for providing at least one of said digital electrical signals, a source of optical signals operable to generate a sequence of optical pulses, said pulses having a duration much shorter than a duration of said digital electrical signals. and including means for causing said sequence of optical pulses to be synchronized with said timing reference;

means for providing an input for said at least one signal source with an output of said optical signal source: and modulator means for causing said digital electrical signals from said at least one signal source to be sampled in synchronism with output pulses from said optical signal source, whereby an output of said modulator means is representative of a digital state of said electrical signal and in synchronism with said timing reference.

2. The apparatus of claim 1, further including an optical splitter coupled between said optical signal source and one or more of said modulator means for causing said sequence of optical pulses to be replicated into a plurality of substantially duplicate copies thereof, whereby one or more of said copies is provided as a sampling signal to said one or more of said modulator means.

3. The apparatus of claim 2, wherein said optical splitter is further operable to cause one of said duplicate copies of said sequence of optical pulses to be provided to said means for providing an input.

4. The apparatus of claim 1, wherein said modulator means is selected from the group consisting of electroabsorption modulators and electrooptic modulators.

5. The apparatus of claim 1, wherein said modulator means is selected from the group consisting of Quantum-well modulators, bulk semiconductor modulators, Lithium Niobate devices and electrically gated optical amplifiers.

6. The apparatus of claim 1, further including at least one amplifier for amplifying an output of said modulator means.

7. The apparatus of claim 1, wherein said modulator means is further operable to provide an amplification of said output thereof.

8. The apparatus of claim 7, wherein said modulator means is a fiber-pigtailed laser diode amplifier.

9. The apparatus of claim 1, wherein said optical pulses produced from said optical signal source are in a range of between 10–300 ps.

10. The apparatus of claim 1, wherein said one or more of said signal sources correspond to line cards of a node in a telecommunications system.

11. The apparatus of claim 10, wherein signals from said one or more signal sources include ATM data.

12. In a system for processing digital signals including one or more sources of electrical signals to be processed and wherein at least a portion of said electrical signals is referenced to a common timing signal, an apparatus for causing a resynchronization of said electrical signals with said timing reference comprising:

an optical clock means for generating a sequence of optical clock pulses, said pulses having a duration much shorter than a duration of said digital electrical signals, and including means for causing said sequence of optical clock pulses to be synchronized with said timing reference;

modulator means for causing said electrical signals from at least one of said one or more signal sources to be sampled in synchronism with output pulses from said optical clock means whereby an output of said modulator means is representative of a digital state of said electrical signal and in synchronism with said timing reference and;

optical signal replication means for causing said sequence of optical clock pulses to be replicated into a plurality of substantially duplicate copies thereof whereby one or more of said copies is provided as a sampling signal to said one or more of said modulator means.

13. The apparatus of claim 12, wherein said optical signal replication means is implemented as an optical splitter coupled between said optical clock means and at least one of said modulator means.

14. The apparatus of claim 12, wherein said at least one of said modulator means is selected from the group consisting of Quantum-well modulators, bulk semiconductor modulators, Lithium Niobate devices and electrically gated optical amplifiers.

15. The apparatus of claim 12, wherein said at least one of said modulator means is further operable to provide an amplification of an output thereof.

16. The apparatus of claim 12, wherein said at least one of said modulator means is a gain modulated fiber-pigtailed semiconductor amplifiers.

17. The apparatus of claim 1, wherein said optical pulses produced from said optical clock means are in a range of between 10–300 ps.

18. The apparatus of claim 1, wherein said optical pulses produced from means optical clock means have a wavelength of approximately 850 nm.

19. A method for resynchronization of electrical signals in a digital system, said method comprising the steps of:

generating a sequence of optical pulses said pulses having a duration much shorter than a duration of said electrical signals and having a known timing relationship to a timing reference for said electrical signals and causing said electrical signals to be sampled in synchronism with said generated optical pulses, whereby an output of said sampling operation is representative of a digital state of said electrical signal and in synchronism with said timing reference.

20. The method of claim 19, further including the step of causing said generated sequence of optical pulses to be replicated into a plurality of substantially duplicate copies thereof whereby one or more of said copies is provided as a sampling signal to said step of. causing said electrical signals to be sampled.

21. The method of claim 19, including the further step of causing an output of said step of causing said electrical signals to be sampled to be further amplified.

22. The method of claim 19 further including the step of causing an output of said step of causing said electrical signals to be communicated over optical channels having a controlled delay.

23. The apparatus of claim 1, wherein a plurality of output signals are produced by said modulator means and all of said output signals are of a substantially same optical wavelength.

* * * * *